United States Patent [19]

Ito

[11] Patent Number: 4,665,947
[45] Date of Patent: May 19, 1987

[54] TRANSFER SWITCH FOR DIFFERENTIAL TYPE ACTUATORS

[75] Inventor: Shoji Ito, Nagoya, Japan

[73] Assignee: Aisin Seiki Kabushiki Kaisha, Kariya, Japan

[21] Appl. No.: 813,838

[22] Filed: Dec. 27, 1985

[51] Int. Cl.$^4$ ............................................. F16K 11/02
[52] U.S. Cl. ................................ 137/625.21; 91/536
[58] Field of Search ............................. 91/534, 536; 137/625.21

[56] References Cited

U.S. PATENT DOCUMENTS

| | | | |
|---|---|---|---|
| 2,878,786 | 3/1959 | Vuillemin | 91/536 |
| 3,297,052 | 1/1967 | Robinson | 137/625.21 |
| 3,564,974 | 2/1971 | Painter | 91/536 |

FOREIGN PATENT DOCUMENTS 239802  7/1969  U.S.S.R. ................................ 91/536

Primary Examiner—Robert G. Nilson
Attorney, Agent, or Firm—Oblon, Fisher, Spivak, McClelland & Maier

[57] ABSTRACT

A transfer switch for differential type actuators which includes a body having an internal space, a plurality of pairs of output ports connected with the internal space for supplying pressure to a plurality of differential type actuators, a flat control plate rotatable on the output ports, passages of two routes being arranged on one surface of the control plate which are connectable selectively with the plurality of output ports, input ports connected with the individual passes, and a rotary mechanism for changing over selectively the position of the control plate, whereby the function of the differential type actuator can be exerted fully and a plurality of differential type actuators can be controlled selectively and reliably.

3 Claims, 4 Drawing Figures

| DIAL POSITION | PORTS ON NEGATIVE PRESSURE SIDE | PORTS ON ATMOSPHERE SIDE | WORKING DIRECTION OF ACTUATORS |
|---|---|---|---|
| A | 3, 5 | 4, 6 | I ←<br>II ← |
| B | 4, 5 | 3, 6 | I →<br>II ← |
| C | 4, 6 | 3, 5 | I →<br>II → |

TRANSFER SWITCH FOR DIFFERENTIAL TYPE ACTUATORS

BACKGROUND OF THE INVENTION

1. Field of the Invention

This invention relates to a transfer switch for differential type actuators which supplies pressure to and controls a plurality of differential type actuators capable of operating in response to a pressure difference appearing on opposite sides of a piston or diaphragm.

2. Description of the Prior Art

To achieve some linear binary mechanical control the differential type actuator is used. For example, a 2WD/4WD changeover system for the automobile transfer section uses such actuators. The foregoing changeover system is designed so that the vacuum pressure of a manifold is made to act on respective chambers of the differential type actuator via solenoid valves. Its control is of the electric type in which when the differential type actuator is to be actuated in one direction, a solenoid valve connected with a chamber positioned in the working direction of the actuator is energized to suck the air within the chamber and the opposite chamber is opened so as to be supplied with the atmosphere. When the actuator is to be actuated in the opposite direction to the above, suction and supply of the air are reversed.

Regarding the mechanical transfer switch, U.S. Pat. No. 4,328,832 discloses a multistage changeover type orifice device. This multistage changeover type orifice device has a plurality of orifice passes provided in one input route and can change over the degree of throttling of fluid in multiple stages by controlling opening/closing of these orifice passes by means of control members. In case the foregoing device is used to control a plurality of differential type actuators, its individual output ports are connected with the chambers on one side of the differential type actuators, with those on the other side being opened.

In case the solenoid valve is used as the transfer switch for control of the differential type actuator, two solenoid valves are needed per differential type actuator to control individual chambers. Accordingly, such configuration is not advantageous from the point of view of costs, arrangement space, weight, etc. in case a plurality of differential type actuators are to be controlled at a time.

The mechanical multistage changeover type orifice device cannot make good use of the function of the differential type actuator because it has only one input route, and thus is not suited for control of such actuators.

SUMMARY OF THE INVENTION

It is an object of the present invention to provide a transfer switch for differential type actuators which has input ports of two routes and can control a plurality of differential type actuators either concurrently or selectively.

To achieve the foregoing object, the present invention provides a transfer switch for differential type actuators which comprises a body having an internal space, a plurality of pairs of output ports connected with the internal space for supplying pressure to a plurality of differential type actuators, a flat control plate rotatable on the output ports, passages of two routes arranged on one surface of the control plate which are connectable selectively with the plurality of output ports, input ports connected with the individual passes, and rotary means for changing over selectively the position of the control plate.

In one preferred mode, the input port on a high-pressure side is connected with the part of the internal space on the back side of the control plate having the passages of two routes.

The differential type actuator is generally operated by tne use of negative pressure and atmospheric pressure, or of atmospheric pressure and a high pressure, as the input pressure. For clarity of explanation, the negative pressure and atmospheric pressure are employed as the input herein.

In the transfer switch for differential type actuators according to the present invention, the negative pressure and atmospheric pressure of the input ports are introduced independently into the passes of two routes arranged on one surface of the control plate. Thus, the negative pressure acts only on one route and the atmospheric pressure on the other route, and each pressure does not vary even when the control plate is rotated by the rotary means. Further, the passes of two routes and the output ports are arranged so that they come into connection with the individual input ports in a given order when the control plate is rotated. Thus, referring to one output port, either the negative pressure or atmospheric pressure is introduced in response to rotation of the control plate, and in the course of operation, there appear two states: one in which the pressure is changed over and the other in which the pressure is kept unchanged.

In operation, when the negative pressure is introduced into one chamber of the differential type actuator, the atmospheric pressure is introduced into the opposite chamber; thus, to actuate one differential type actuator two output ports are selected depending upon a control procedure so as to supply the pair of negative pressure and atmosphric pressure.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

DESCRIPTION OF THE PREFERRED EMBODIMENT

An embodiment of a transfer switch for differential type actuators according to the present invention will now be described with reference to the drawings.

Figure 1:
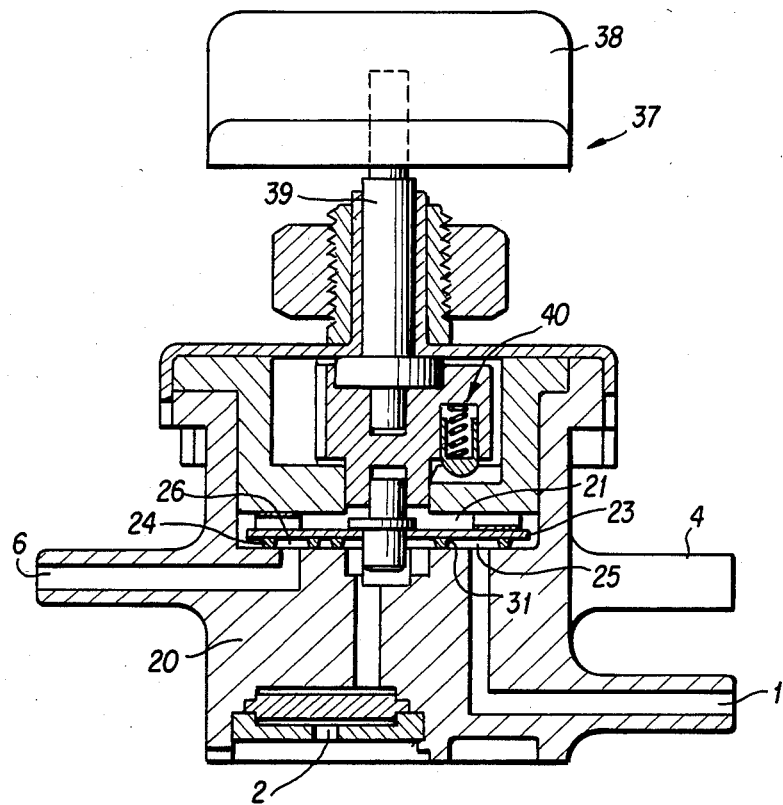
FIG. 1 is a sectional view showing an embodiment of a transfer switch for differential type actuators according to the present invention.

In FIG. 1, a body 20 has an internal space 21 and is provided with a plurality of output ports 3–6 connected with the space 21. These output ports 3–6 form pairs and supply pressure to actuate a plurality of differential type actuators (see FIG. 3). On the output ports 3-6 a flat control plate 23 is positioned rotatably.

Figure 2:
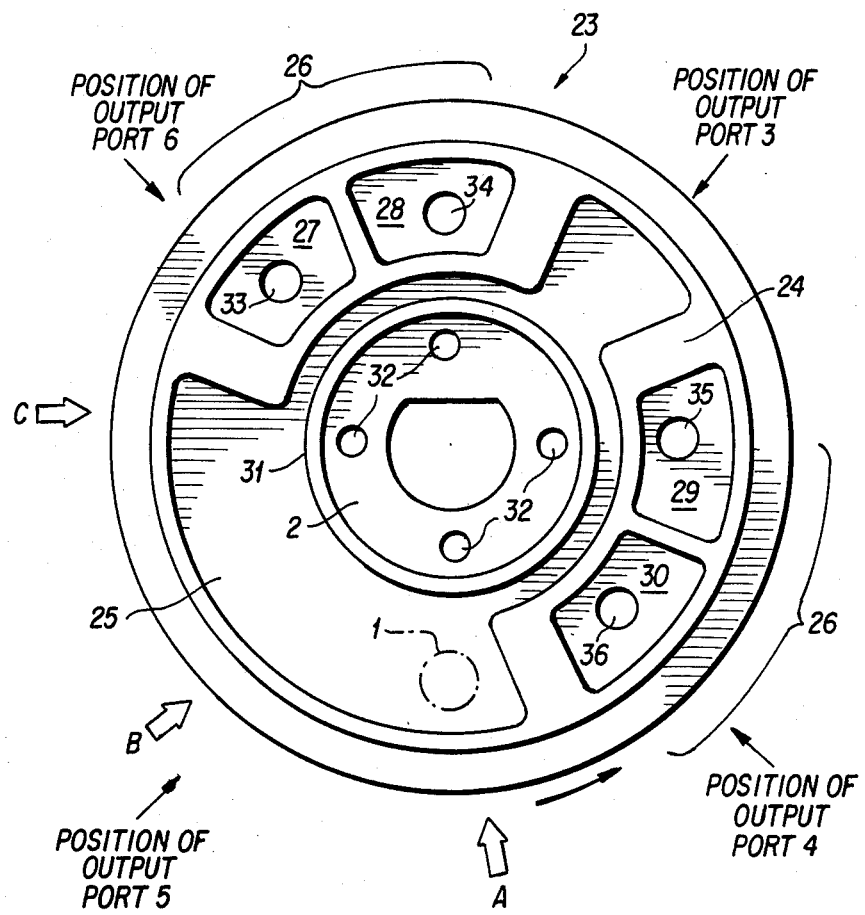
FIG. 2 is a bottom view of a control plate.

The configuration of the control plate 23 varies depending upon the number of differential type actuators connected and their operation procedure, one example of which is shown in FIG. 2. This illustrated configuration is designed so as to be used in a system shown in FIG. 3, accordingly, it will be described with reference to the system. To one surface of the control plate 23 opposite the output ports 3 through 6 a slide member 24 is attached which slides on the output ports 3 through 6 and maintains airtightness. Passages 25 and 26 following two routes are created by the shape of this slide member 24. The passage 25 is connected with an input port 1 on the negative-pressure side, and the passage 26 is connected with an input port 2 on the atmospheric-pressure side which is divided into four portions, thereby forming chambers 27-30. A slide member 31 of a small diameter positioned in the center portion is included to separate the input port 1 on the negative-pressure side and the input port 2 on the atmospheric-pressure side from each other. The input port 2 on the atmospheric-pressure side is connected through inner through-holes 32 bored in the control plate 23 with part of the space 21 on the back side of the control plate 23 and further through outer through-holes 33-36 with the respective chambers 27-30.

The control plate 23 is secured to rotary means 37 which is composed of a dial 38 and a plurality of shaft parts 39 in the embodiment. The rotary means 37 is provided with a notch mechanism 40 for positioning the control plate 23. When the dial 38 is set to position A, the input port 1 on the negative-pressure side is located in the position represented by the two-dot chain line in FIG. 2. As the control plate 23 shown in FIG. 2 is rotated counterclockwise by means of the dial 38, the position of the arrow B comes to the position of the input port 1, and then the position of the arrow C moves and comes to the position of the input port 1. The positions of the output ports 3 through 6 are as shown in FIG. 2 by the arrows. By setting the dial position to A, or B, or C the differential type actuators I and II operate as depicted in the table of FIG. 4.

Figures 3, 4:
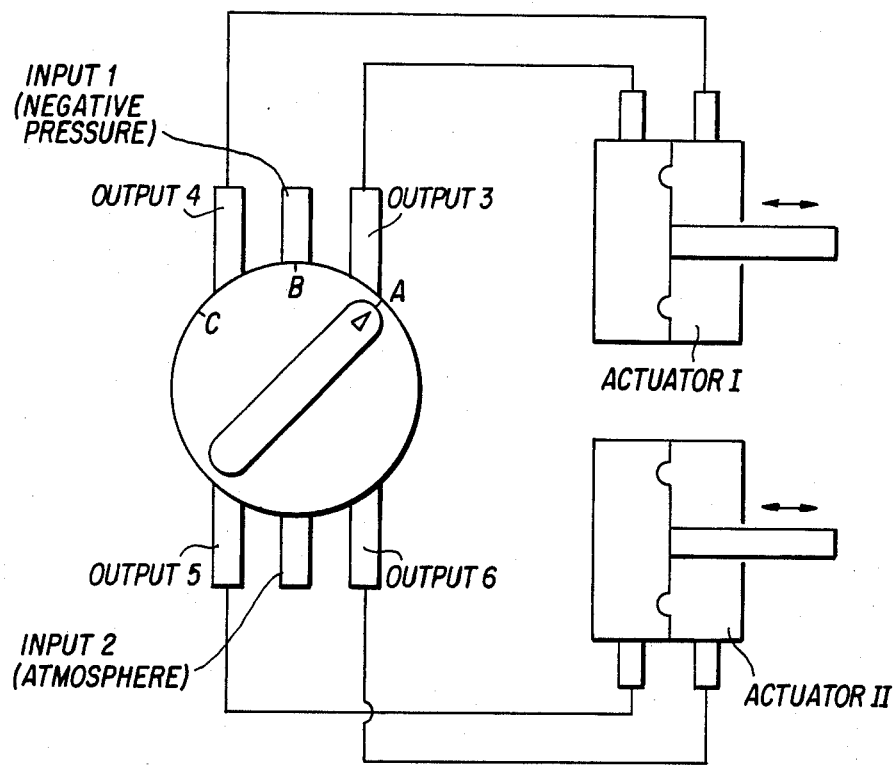
FIG. 3 is a system diagram showing the transfer switch according to the present invention which is applied so as to actuate two differential type actuators.
FIG. 4 is a table showing the operation conditions of the system shown in FIG. 3.

For instance, the two differential type actuators of the system shown in FIG. 3 can be actuated in accordance with the procedure shown in FIG. 4.

Into the input port 1 on one side of the transfer switch the negative pressure is introduced and the atmospheric pressure into the input port 2 on the other side. The chamber on the left-hand side of one differential type actuator I is connected with the output port 3 on the upper right-hand side of the transfer switch and the chamber on the right-hand side with the output port 4 on the upper left-hand side. The chamber on the left-hand side of the other differential type actuator II is connected with the output port 6 on the lower right-hand side and the chamber on the right-hand side with the output port 5 on the lower left-hand side.

When the control plate is set to position A by means of the dial serving as the rotary means, the output ports 3 and 5 are connected with the input port 1 thereby taking the negative pressure, whereas the output ports 4 and 6 are connected with the input port 2 thereby communicating with the atmospheric pressure. As a result, the two differential type actuators I and II move to the left-hand position in FIG. 3.

As the dial is rotated and the control plate is set to position B, the output ports 4 and 5 are connected with the input port 1 thereby communicating with the negative pressure and the output ports 3 and 6 are connected with the input port 2 thereby communicating with the atmospheric pressure. In this case, the differential type actuator I moves rightward, whereas the differential type actuator II keeps its previous position because no pressure changes over.

As the dial is further rotated and the control plate is set to position C, the output ports 4 and 6 are connected with the input port 1 thereby communicating with negative pressure, whereas the output ports 3 and 5 are connected with the input port 2 thereby communicating with the atmospheric pressure. As a result, the other differential type actuator II moves rightward; but, the differential type actuator I does not operate. In this way, by the use of the configuration including the passes of two routes and of the combination arrangement of output ports, the differential type actuators can be operated through the procedure of three steps.

As described hereinabove, according to the present invention, because the input has two routes, the function of the differential type actuator can be exerted fully, and a plurality of differential type actuators can be controlled selectively by the use of a simple configuration.

What is claimed is:

1. A transfer switch for differential type actuators, comprising:
   a body having an internal space;
   a plurality of pairs of output ports connected with said internal space for supplying pressure to a plurality of differential type actuators;
   a flat control plate positioned within said body and rotatable with respect to said output port;
   a slide member attached on one surface of said flat control plate adjacent said output ports so as to be of sliding engagement with said output ports and for maintaining an air-tight seal therewith;
   first and second passage means directed along first and second routes and formed individually on one surface of said flat control plate, said first and second passage means comprising a high and low pressure passage connectable selectively with said plurality of output ports wherein one of said high and low pressure passages is formed on both sides of said control plate;
   a plurality of input ports connected with said passage means, respectively; and
   rotary means connected with said control plate for changing selectively the position of the control plate.

2. A transfer switch for differential type actuators according to claim 1, wherein a high-pressure side of one of said input ports is connected with a portion of said internal space on a backside of said control plate.

3. A transfer switch for differential type actuators according to claim 1, wherein said rotary means comprises a notch mechanism for positioning said control plate.

* * * * *

UNITED STATES PATENT AND TRADEMARK OFFICE
CERTIFICATE OF CORRECTION

PATENT NO. : 4,665,947
DATED     : May 19, 1987
INVENTOR(S) : Shoji Ito

It is certified that error appears in the above-identified patent and that said Letters Patent is hereby corrected as shown below:

On the title page insert Foreign Application Priority Data

-- Dec. 27, 1984 (JP) Japan............... 59 196196 --.

Signed and Sealed this

Twenty-ninth Day of March, 1988

Attest:

DONALD J. QUIGG

Attesting Officer  Commissioner of Patents and Trademarks